Jan. 16, 1923.

H. M. COATES.
VEHICLE WHEEL.
FILED FEB. 14, 1921.

1,442,603

Inventor
Harry M. Coates,
By
Attorneys

Patented Jan. 16, 1923.

1,442,603

UNITED STATES PATENT OFFICE.

HARRY M. COATES, OF DETROIT, MICHIGAN.

VEHICLE WHEEL.

Application filed February 14, 1921. Serial No. 444,874.

*To all whom it may concern:*

Be it known that I, HARRY M. COATES, a citizen of the United States of America, residing at Detroit, in the county of Wayne and State of Michigan, have invented certain new and useful Improvements in Vehicle Wheels, of which the following is a specification, reference being had therein to the accompanying drawing.

This invention relates to disk wheels and has special reference to a double disk wheel having a body portion composed of a hub, spaced disks thereon, and a tire supported by the peripheral edges of the disks.

My invention aims to provide a wheel of the above type wherein one of the disks is smaller than the other, and the small disk provided with a detachable tire engaging member which will cooperate with the large disk in holding a tire relative to the body of the wheel. The detachable member when in place represents a continuation of the small disk, and it is in this connection that said disks are alike when manufactured, but one of said disks is circumferentially cut at its marginal edges so that the peripheral portion of the disk may be utilized as a tire supporting or rim member, and said member is provided with an annular reinforcement which will correctly position the member relative to the small disk and at the same time permit of fastening means being utilized for connecting the disks together, with the detachable member in place for holding a tire.

The construction entering into the wheel will be hereinafter described and then claimed, and reference will now be had to the drawing, wherein—

Figure 1:
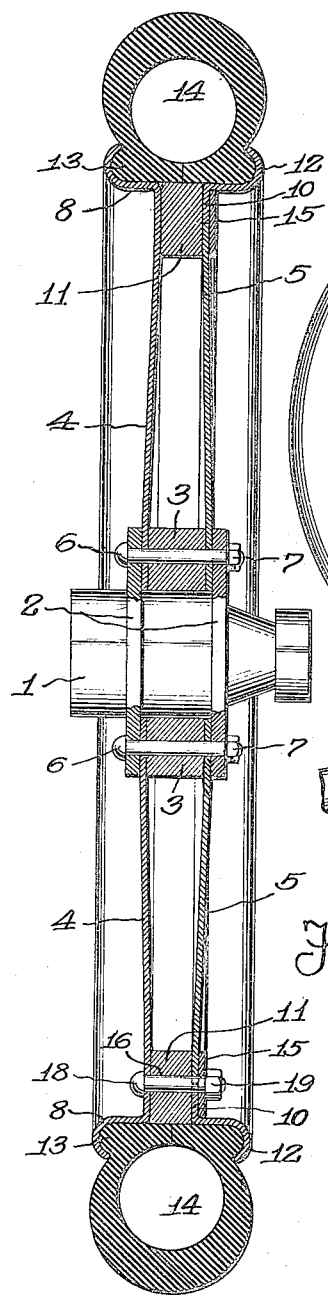
Figure 1 is a vertical cross sectional view of a double disk wheel in accordance with my invention.
Figure 3:
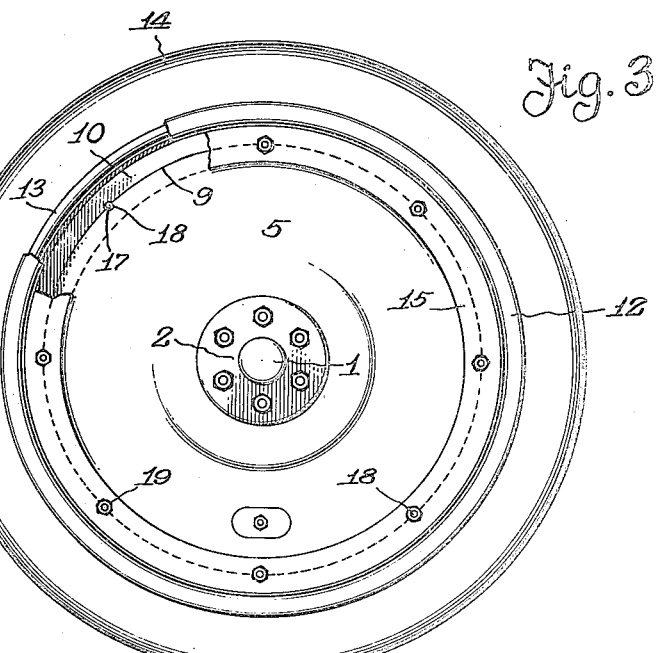
Fig. 3 is a side elevation of the wheel, partly broken away and partly in section.
Figure 4:
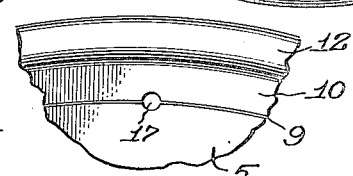
Fig. 4 is an enlarged side elevation of a portion of the small disk and its detachable member.
Figure 5:
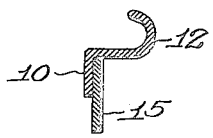
Fig. 5 is a cross sectional view of the detachable member.
Figure 2:
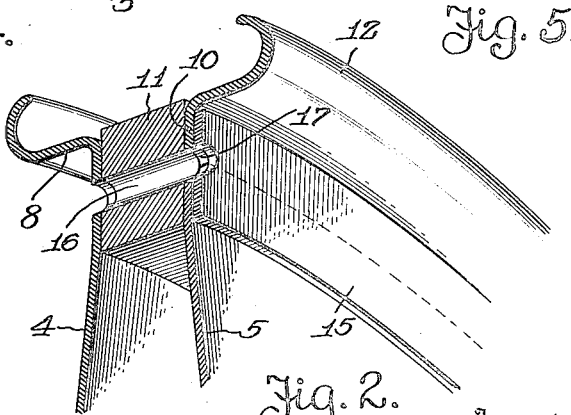
Fig. 2 is a perspective view of a portion of the wheel.

In the drawing, the reference numeral 1 denotes a conventional form of hub, and on said hub are flanges 2 with an annular filler member 3 therebetween, and mounted between the flanges 2 and the filler member 3 are large and small disks 4 and 5 respectively. These disks may be held in engagement with the flanges 2 and the inner filler member 3 by bolts 6 and nuts 7 or other fastening means, just so that the disks 4 and 5 will be held to provide a rigid double disk wheel body.

The large disk 4 has its peripheral edges shaped to provide a clencher tire engaging rim 8, and the disk 5 is made the same way, but this disk is circumferentially cut, as at 9, so that its peripheral clencher tire engaging rim portion will constitute a detachable member, designated 10. With this member cut from the disk 5 which makes said disk smaller in diameter than the large disk 4, it is possible to fit the detachable member 10 on the edges of the small disk 5 so as to represent a continuation thereof.

Mounted between the disks 4 and 5 is an outer annular filler member 11 which cooperates with the inner filler member 3 in maintaining the disks 4 and 5 in spaced relation. The peripheral edges of the small disk 5 do not occupy the entire space of the filler member 11 so as to provide clearance for the detachable member 10, and said detachable member may be mounted against the outer filler member 11 with its tire engaging portion 12 opposed to the similar portion of the large disk 4, so as to cooperate with the large disk in supporting the clencher edges 13 of an outer tire casing 14. The outer tire casing 14 is shown as seated directly on the peripheral edges of the disk and the outer filler member.

Brazed, spot welded or otherwise connected to the detachable member 10 is a ring or retaining member 15, and this ring has its outer edge bracing the tire engaging portion 12 of the detachable member, while the inner edge of the rim is adapted to overlap the edges of the disk 5, as best shown in Fig. 1. The ring 15 therefore defines the position of the detachable member 10 on the small disk 5, and with said ring fixedly secured to the detachable member 10 it is as though integral.

The outer filler member 11, the disk 4 and the ring 15 are provided with alining openings and the disk 5 and detachable member 10 have the confronting edges thereof recessed to provide openings 17 which will register with the openings 16 and permit of bolts 18 and nuts 19 or other fastening means being employed for holding the detachable member 10 relative to the wheel body.

Suitable provision is made for inflating a pneumatic tire mounted on the wheel, and while in the drawing there is illustrated a preferred embodiment of my invention, it is to be understood that the structural elements are susceptible to such variations and modifications as fall within the scope of the appended claims.

What I claim is:—

1. A disk wheel having disks for supporting a tire, said disks having peripheral edges supporting the tire, one of the disks having its peripheral portion in the form of a detachable member which is set on the body of the disk and overlaps the body thereof.

2. In a double disk wheel, a large disk, a small disk, and a detachable rim member set on the small disk, as a continuation thereof and having its inner edges overlap said small disk so that said rim member may cooperate with said large disk in supporting a tire.

3. A vehicle wheel having disks, provided with tire engaging edges, one of said disks being circumferentially cut to make its engaging edge a detachable member, and means on the detachable member of said disk to define its position on said disk.

4. A vehicle wheel as in claim 3, characterized by said means bracing the edge of the detachable member and extending on to the outer face of the supporting disk.

In testimony whereof I affix my signature in presence of two witnesses.

HARRY M. COATES.

Witnesses:
ANNA M. DORR,
KARL H. BUTLER.